(12) United States Patent
Eguchi et al.

(10) Patent No.: US 10,698,336 B2
(45) Date of Patent: Jun. 30, 2020

(54) IMAGE FORMING APPARATUS

(71) Applicant: Konica Minolta, Inc., Tokyo (JP)

(72) Inventors: Tatsuya Eguchi, Toyohashi (JP); Hidenari Tachibe, Toyokawa (JP); Makoto Obayashi, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/442,970

(22) Filed: Jun. 17, 2019

(65) Prior Publication Data

US 2020/0004172 A1    Jan. 2, 2020

(30) Foreign Application Priority Data

Jun. 28, 2018  (JP) .................................. 2018-122704

(51) Int. Cl.
| | | |
|---|---|---|
| *G03G 15/043* | (2006.01) | |
| *G02B 26/12* | (2006.01) | |
| *G02B 6/35* | (2006.01) | |
| *G03G 15/041* | (2006.01) | |

(52) U.S. Cl.
CPC ......... *G03G 15/043* (2013.01); *G02B 6/3586* (2013.01); *G02B 26/127* (2013.01); *G03G 15/041* (2013.01)

(58) Field of Classification Search
CPC .. G03G 15/041; G03G 15/043; G02B 6/3586; G02B 26/127
See application file for complete search history.

(56) References Cited

U.S. PATENT DOCUMENTS

| | | | | |
|---|---|---|---|---|
| 6,297,839 B1* | 10/2001 | Komiya | ................. | G02B 26/12 250/236 |
| 2007/0046766 A1* | 3/2007 | Ono | ........................ | B41J 2/471 347/228 |
| 2009/0251755 A1* | 10/2009 | Oda | ..................... | G03G 15/043 359/216.1 |
| 2014/0300677 A1* | 10/2014 | Yoshida | ............. | G03G 15/0435 347/133 |
| 2016/0004144 A1* | 1/2016 | Laroia | .................... | G03B 17/18 348/222.1 |
| 2017/0343922 A1* | 11/2017 | Kyogoku | ............. | G02B 26/123 |
| 2019/0308420 A1* | 10/2019 | Yamamoto | ........... | G02B 26/125 |

FOREIGN PATENT DOCUMENTS

JP    H09230678 A    9/1997

* cited by examiner

*Primary Examiner* — Ryan D Walsh
(74) *Attorney, Agent, or Firm* — Lucas & Mercanti, LLP

(57) ABSTRACT

An image forming apparatus including a polygon mirror that deflects a light beam includes: a light emitter that emits the light beam; an optical sensor that is disposed at a position on which the light beam deflected by the polygon mirror is incident; a detector that detects a minimum level being a light intensity level of the light beam, the lowest within a range detected by the optical sensor; a switcher that switches a light intensity level of the light beam emitted from the light emitter until the detector detects the minimum level; and a determiner that determines a degree of contamination of a component on an optical path of the light beam extending from the light emitter to the optical sensor, on the basis of the minimum level detected when the light intensity level is switched by the switcher.

12 Claims, 13 Drawing Sheets

| MINIMUM LEVEL Lmin | LEVEL VARIATION dL1 | CONTAMINATION DEGREE CLASSIFICATION |
|---|---|---|
| 1 TO 4 | 0 TO 3 | LEVEL A: LOW (NEGLIGIBLE) |
| 5 TO 9 | 4 TO 8 | LEVEL B: HIGH (REQUIRING NOTIFICATION) |
| 10 | 9 | LEVEL C: EXCESSIVE (PROHIBITION ON USE) |

| MINIMUM LEVEL Lmin | LEVEL DIFFERENCE dL2 | CONTAMINATION DEGREE CLASSIFICATION |
|---|---|---|
| 1 TO 4 | 10 TO 7 | LEVEL A: LOW (NEGLIGIBLE) |
| 5 TO 9 | 6 TO 2 | LEVEL B: HIGH (REQUIRING NOTIFICATION) |
| 10 | 1 | LEVEL C: EXCESSIVE (PROHIBITION ON USE) | ured by a synchronization optical sensor requires mea-
IMAGE FORMING APPARATUS The entire disclosure of Japanese patent Application No. 2018-122704, filed on Jun. 28, 2018, is incorporated herein by reference in its entirety.

BACKGROUND

Technological Field

The present invention relates to an image forming apparatus.

Description of the Related Art

Electrophotographic image forming apparatuses are each configured to emit light (pattern exposure) depending on image data while charging the circumferential surface of a tubular photoreceptor rotating, thereby partially removing electric charge on the circumferential surface to form a latent image (electrostatic latent image).

As a method for pattern exposure, a method of deflecting a laser beam in the direction of a rotation axis of a photoreceptor by using a polygon mirror to line-sequentially perform main scanning is widely used. In this method, in order to align the heads of lines of an image, an optical sensor is disposed at an appropriate position in an optical path of a laser beam, and the main scanning is started on the basis of timing at which the laser beam is incident on the optical sensor.

Not all the image forming apparatuses are used in office environments. Some image forming apparatuses are used in dusty environments, such as factory or site of event. In addition, some image forming apparatuses are constantly used in humid environments.

When dust and powder dust enter an image forming apparatus and adhere to a polygon mirror, that is, when a mirror surface thereof becomes dirty, the light intensity of a laser beam reflected by the polygon mirror and incident on a photoreceptor decreases. Particularly, a high-speed image forming apparatus rotating a polygon mirror at high speed tends to cause contamination due to powder dust sucked into a rotating airflow and adhering on the polygon mirror.

JP 9-230678 A discloses a related art for correcting a reduction in the intensity of light emitted to a photoreceptor caused by dirt on a scanning optical system including a polygon mirror.

In JP 9-230678 A, a reduction in the intensity of light emitted to the photoreceptor is measured by detecting a photoelectric conversion level of a photodiode provided for synchronization of main scanning, and the intensity of light output is controlled so that the intensity of light emitted has a predetermined value.

As in the technique of JP 9-230678 A described above, a method of measuring, as information indicating the degree of contamination in an optical system, the intensity of light received by a synchronization optical sensor requires measurement of the intensity of light received precisely. Therefore, it is necessary to detect a peak value of a light reception signal by using a peak hold circuit or quantify the pulse width of the light reception signal by counting a clock, disadvantageously complicating a circuit for measurement on the light receiving side.

SUMMARY

The present invention has been made in view of the above problems, and it is an object of the present invention to simplify a circuit used for light intensity measurement for determining the degree of contamination of a scanning optical system.

To achieve the abovementioned object, according to an aspect of the present invention, there is provided an image forming apparatus including a polygon mirror that deflects a light beam, and the image forming apparatus reflecting one aspect of the present invention comprises: a light emitter that emits the light beam; an optical sensor that is disposed at a position on which the light beam deflected by the polygon mirror is incident; a detector that detects a minimum level being a light intensity level of the light beam, the lowest within a range detected by the optical sensor; a switcher that switches a light intensity level of the light beam emitted from the light emitter until the detector detects the minimum level; and a determiner that determines a degree of contamination of a component on an optical path of the light beam extending from the light emitter to the optical sensor, on the basis of the minimum level detected when the light intensity level is switched by the switcher.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
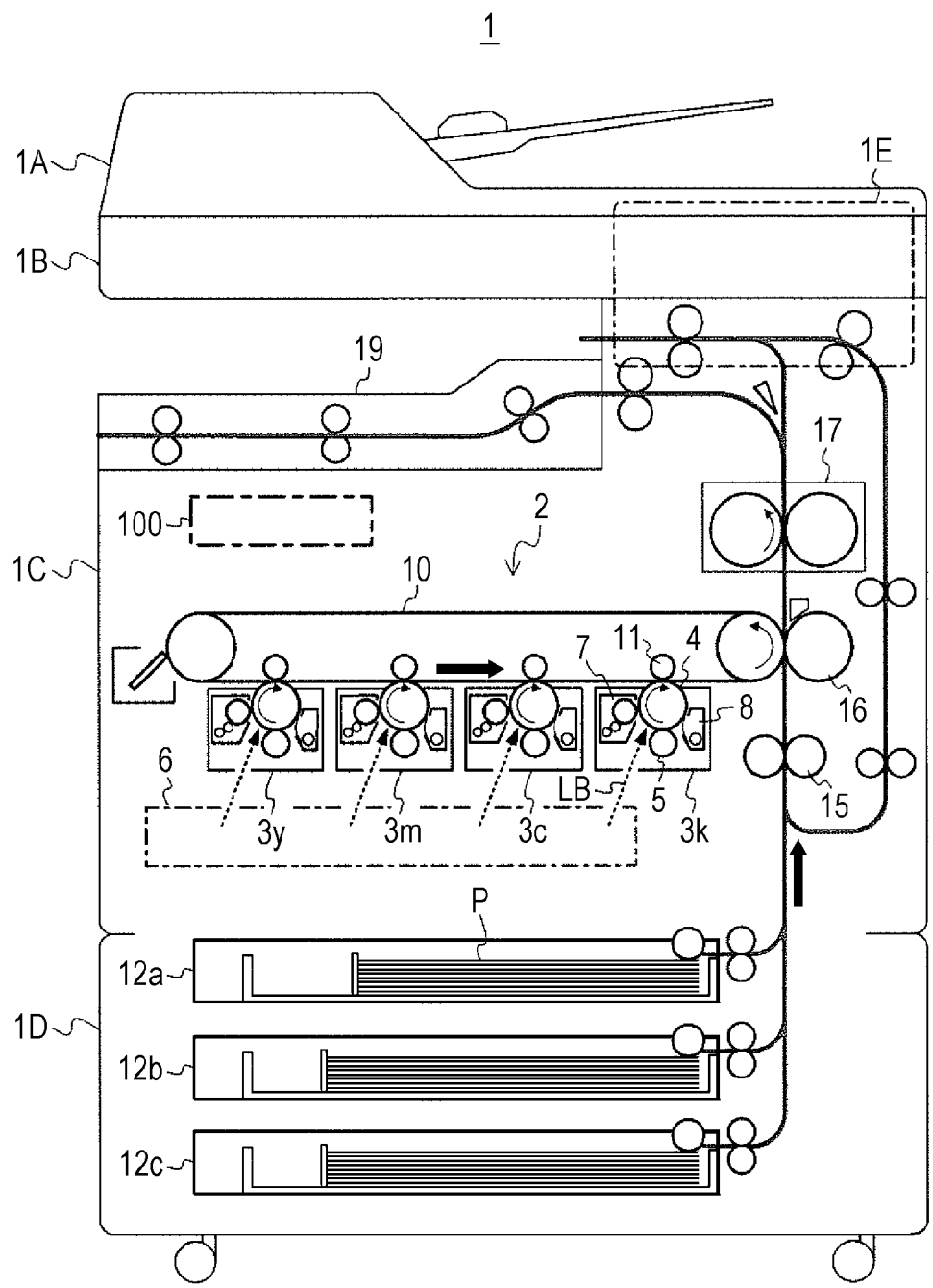
FIG. 1 is a diagram illustrating an overview of a configuration of an image forming apparatus according to an embodiment of the present invention.

FIG. 1 illustrates an overview of a configuration of an image forming apparatus 1 according to an embodiment of the present invention. The image forming apparatus 1 is a multi-functional peripheral (MFP) in which functions such as a copying machine, a printer, a facsimile machine, and an image reader are integrated.

The image forming apparatus 1 includes an auto document feeder (ADF) 1A, a flat bed scanner 1B, an electrophotographic color printer 1C, a sheet cabinet 1D, an operation panel 1E, and the like.

The auto document feeder 1A conveys a document (sheet) set in a document tray to a reading position in the scanner 1B. The scanner 1B reads an image from a sheet-shaped document conveyed from the auto document feeder 1A or various documents set on a platen glass to generate image data.

The color printer 1C forms a color or monochrome image on one side or both sides of a recording sheet (paper sheet) P in a print job, such as copying, network printing (PC printing), facsimile reception, or box printing. For example, in a copying job, an image is formed on the basis of the image data generated by the scanner 1B.

The color printer 1C includes a tandem printer engine 2. The printer engine 2 has four imaging units 3y, 3m, 3c, and 3k, a printer head 6, an intermediate transfer belt 10, and the like.

Each of the imaging units 3y, 3m, 3c, and 3k includes a cylindrical photoreceptor 4, a charge roller 5, a developer 7, a cleaner 8, and the like. The imaging units 3y, 3m, 3c, and 3k have a similar basic configuration.

The printer head 6 emits a laser beam LB as light for pattern exposure to each of the imaging units 3y, 3m, 3c, and 3k. In the printer head 6, main scanning is performed to deflect the laser beam LB in a direction parallel to a rotation axis of a photoreceptor 4. In parallel with this main scanning, vertical scanning is performed to rotate the photoreceptor 4 at a constant speed.

The intermediate transfer belt 10 is a member to which a toner image is to be transferred in primary transfer of the toner image, and is wound around and rotated between a pair of rollers. On an inside of the intermediate transfer belt 10, a primary transfer roller 11 is disposed for each of the imaging units 3y, 3m, 3c, and 3k.

The sheet cabinet 1D includes three tiers of drawers, that is, paper feed trays 12a, 12b, and 12c. The sheet cabinet 1D picks up a sheet P from any one of the paper feed trays selected according to job specification and supplies the sheet P to the color printer 1C positioned above.

The operation panel 1E has a touch panel display for displaying a screen for operation by the user, and outputs a signal according to an input operation. In response to this signal, the operation of the image forming apparatus 1 is controlled by a control circuit 100.

In a color printing mode, the imaging units 3y, 3m, 3c, and 3k form toner images having four colors of Y (yellow), M (magenta), C (cyan), and K (black) in parallel. The toner images having four colors are sequentially primarily transferred to the intermediate transfer belt 10 during rotation. Firstly, the toner image of Y is transferred, and then, the toner image of M, the toner image of C, and the toner image of K are sequentially transferred so as to overlap the toner image of Y.

When each of the toner images primarily transferred is opposed to a secondary transfer roller 16, the toner image is secondarily transferred to the sheet P conveyed from the sheet cabinet 1D through a timing roller 15. After the secondary transfer, the sheet P sequentially passes through a fuser 17 and a communication conveyance path 19 and is sent out to a finisher. When the finisher is not connected to the image forming apparatus 1, the sheet P is output to a paper output tray provided instead of the communication conveyance path 19. When passing through the fuser 17, the toner image is fixed on the sheet P by being heated and pressed.

Figures 2A, 2B:
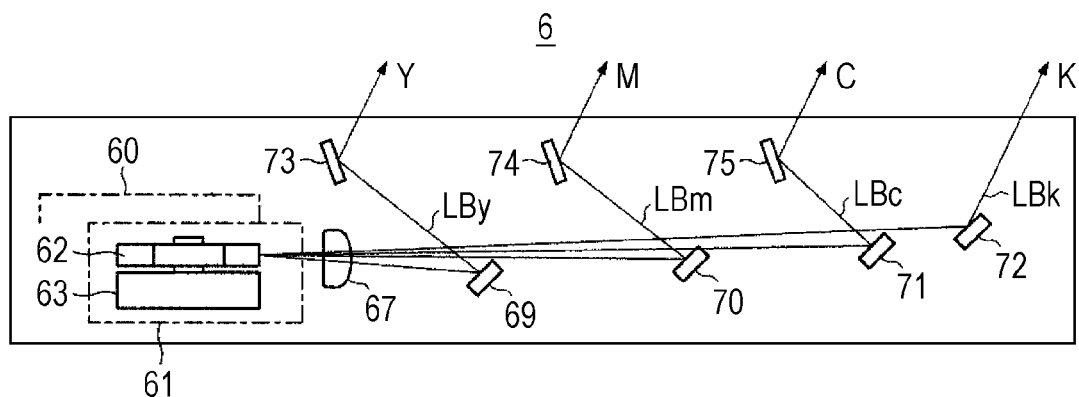
FIGS. 2A and 2B are diagrams illustrating a configuration of a printer head.
Figure 3:
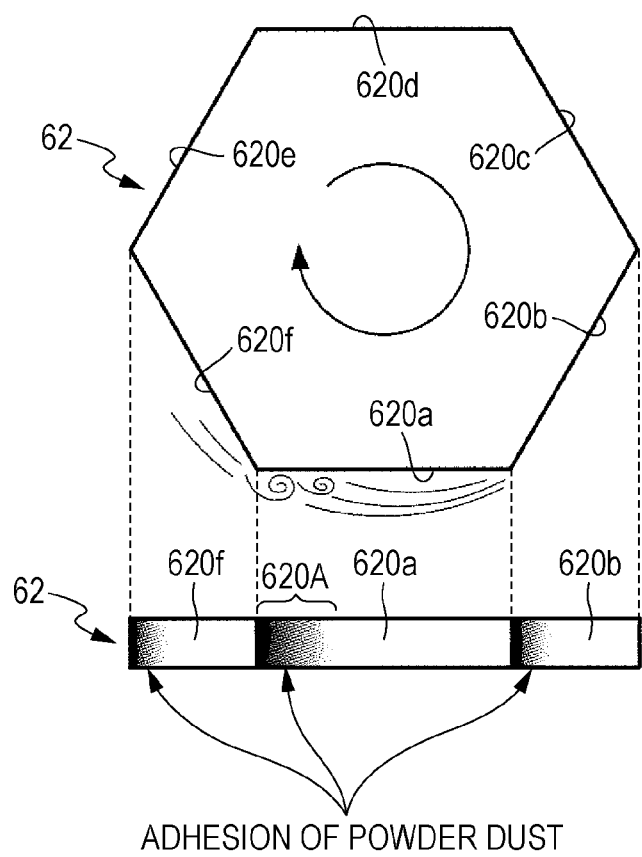
FIG. 3 is a diagram illustrating a tendency of contamination of a polygon mirror.
Figure 4:
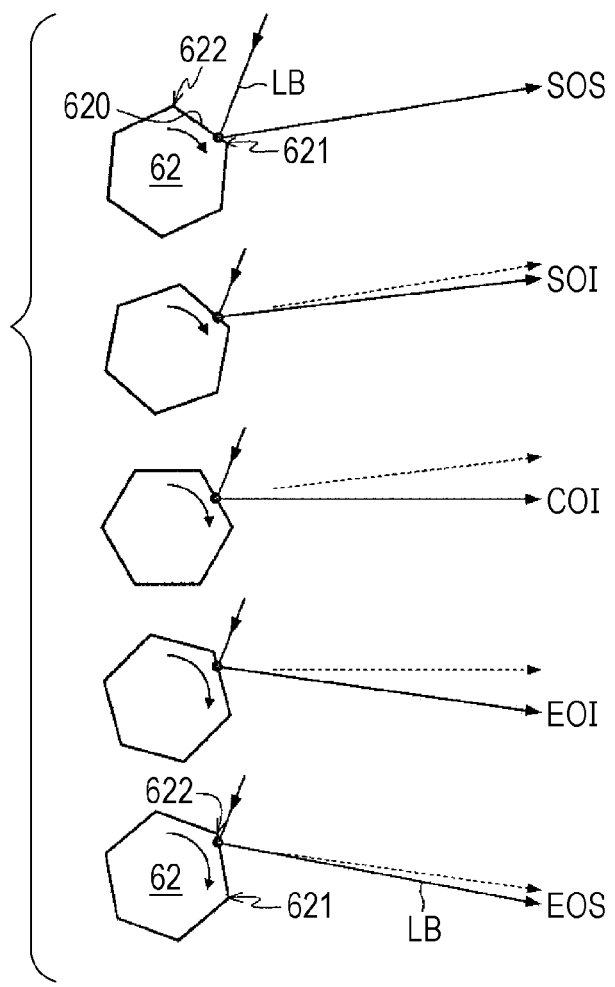
FIG. 4 is a diagram illustrating a relationship between a rotation angle and a beam incident position in the polygon mirror.

FIGS. 2A and 2B illustrate a configuration of the printer head 6. Specifically, FIG. 2A shows a configuration as viewed from the front side, and FIG. 2B shows the configuration as viewed from above. Furthermore, FIG. 3 illustrates a tendency of contamination of a polygon mirror 62, and FIG. 4 illustrates a relationship between a rotation angle of the polygon mirror 62 and a beam incident position.

As illustrated in FIGS. 2A and 2B, the printer head 6 includes a light source unit 60, a polygon mirror unit 61, an fθ lens 67, reflection mirrors 68 to 77, and two optical sensors 78 and 79.

The light source unit 60 is a unit for emitting the laser beam LB for exposure according to a latent image to the four photoreceptors 4 provided one by one in the imaging units 3y, 3m, 3c, and 3k. In the light source unit 60, a set of a laser light source, a collimator lens, and a mirror is provided for each of the imaging units 3y, 3m, 3c, and 3k.

Four laser beams LB emitted from the laser light sources and collimated by the collimator lens are reflected on the respective mirrors and travel in substantially the same direction. Each of the four mirrors is disposed at a level different from those of the others or is made into a half mirror, inhibiting laser beams LB reflected on the other mirrors from being shielded.

In color printing, a total of four laser beams LBy, LBm, LBc, and LBk corresponding to respective colors of Y, M, C, and K are emitted from the light source unit 60. The emitted laser beams LB are guided to the polygon mirror unit 61 by the reflection mirror 68.

The polygon mirror unit 61 is an optical device in which the polygon mirror 62 and a polygon mirror motor 63 for rotatably driving the polygon mirror 62 are stored in a housing 610 and integrated with each other. The housing 610 is provided with glass windows 611 and 612 through which the laser beams LB pass. The polygon mirror unit 61 includes a position sensor 65 for detecting that the rotational angle position of the polygon mirror 62 is at a reference position.

Each of the laser beams LB guided by the reflection mirror 68 passes through the glass window 611 and is incident on the polygon mirror 62. The polygon mirror 62 is rotated at high speed in one direction by the polygon mirror motor 63 to deflect the laser beam LB in a main scanning direction M1. The deflected laser beam LB passes through the glass window 611 and proceeds to the fθ lens 67.

The fθ lens 67 corrects the traveling direction of the incident laser beam LB so that main scanning is performed at a constant speed in the photoreceptor 4. The laser beam LB having passed through the fθ lens 67 is guided to the respective photoreceptor 4 of each of the imaging units 3y, 3m, 3c, and 3k by each of the reflection mirrors 69 to 75, and a surface of the photoreceptor 4 is irradiated with the laser beam LB.

Furthermore, the laser beam LB is guided to each of the optical sensors 78 and 79 by each of the reflection mirrors 76 and 77 disposed outside a main optical path (hatched in FIG. 2B) 600A of an optical path 600 through which the laser beam LB passes, and the main optical path 600A corresponds to a latent image forming area (image area) of the photoreceptor 4.

For example, the reflection mirror 76 is disposed in the vicinity of an end portion of the reflection mirror 72 upstream in the main scanning direction M1. Therefore, on the optical sensor 78, the laser beam LB passing through the optical path 600 upstream in the main scanning direction M1 (deflection direction) is incident.

The optical sensor 78 includes a circuit for converting a photoelectric conversion signal to a pulse signal and outputs a start-of-scan (SOS) signal S78. The SOS signal is a pulse signal which is turned on when the intensity of incident laser beam LB is equal to or more than a threshold value and is used as a timing signal for synchronizing the start of the main scanning of lines.

Furthermore, the reflection mirror 77 is disposed in the vicinity of an end portion of the reflection mirror 72 downstream in the main scanning direction M1. Therefore, on the optical sensor 79, the laser beam LB passing through the optical path 600 downstream in the main scanning direction M1 is incident.

The optical sensor 79 outputs an end-of-scan (EOS) signal which is a pulse signal similar to the SOS signal S78. The EOS signal is used as a timing signal for synchronizing the end of the main scanning of the lines.

Incidentally, as a temporal change in the printer head 6, components on the optical path 600 are contaminated, in other words, powder dust or the like adheres on outer surfaces of various optical components, such as a mirror, a lens, and a translucent cover, constituting the optical path 600. When the components on the optical path 600 are contaminated, the laser beams LBy, LBm, LBc, and LBk incident on the photoreceptors 4 which correspond to the colors of Y, M, C, and K have a reduced light intensity.

In the printer head 6 using a beam deflection method, in particular, the polygon mirror 62 is easily contaminated. In addition, as will be described next, the polygon mirror 62 is locally contaminated.

As illustrated in FIG. 3, the polygon mirror 62 has, for example, a regular hexagonal prism shape having low height and has six mirror surfaces 620 (620a to 620f) constituting side surfaces of the hexagonal prism. Each mirror surface 620 has a strip shape having a length corresponding to one side of the regular hexagonal shape. The polygon mirror 62 rotates at a predetermined speed to perform deflection for one line in the main scanning by one mirror surface 620 with the geometric center of the regular polygon as the rotation center.

Note that the shape of the polygon mirror 62, when viewed from above, may be a regular heptagon or another regular polygon.

An airflow is generated by high speed rotation of the polygon mirror 62. Due to this airflow, dust floating inside and outside the image forming apparatus 1 enters the inside of the polygon mirror unit 61 through a fine gap of the printer head 6.

The side surfaces of the polygon mirror 62 have corners, and an airflow vortex is generated in the vicinity of the side surfaces rotating at high speed. In particular, the vortex is likely to be generated on the front end side of each mirror surface 620 in a rotation direction, and the vortex moves as if dragged by the mirror surface 620 as the mirror surface 620 rotates. That is, the polygon mirror 62 rotates while always generating a vortex in the vicinity of the front end side portion 620A of the mirror surfaces 620.

Dust floating around the polygon mirror 62 is caught in this vortex and stuck to a mirror surface 620. Therefore, more dust is stuck to the front end side of the mirror surface 620 compared with the rear end side. That is, the front end side of each mirror surface 620 is more likely to be contaminated with dust compared with the rear end side.

As illustrated in FIG. 4, during main scanning of one line, a position (indicated by a black circle in the figure) on a mirror surface 620 on which laser beam LB is incident moves with the rotation of the polygon mirror 62.

That is, when deflecting the laser beam LB in a direction in which the SOS signal is generated, the laser beam LB is made incident near a front end 621 of the mirror surface 620 in the rotation direction. Then, as the laser beam LB is deflected in a direction to a position (SOI: start of image) where exposure for image formation is started, in a direction to the center of an image (COI: center of image), and in a direction to a position (EOI: end of image) where the exposure ends, the incident position is separated away from the front end 621. When deflecting the laser beam LB in a direction in which the EOS signal is generated, the laser beam LB is made incident near a rear end 622 of the mirror surface 620 in the rotation direction.

Therefore, as the contamination advances, a difference in light intensity between the upstream side and the downstream side in the main scanning direction M1 increases, leading to a remarkable reduction in image quality. In other words, a non-uniform exposure in the main scanning direction M1 causes outstanding unevenness in density and tone reproduction. Furthermore, excessive contamination hinders acquisition of the SOS signal, and an image cannot be formed The reduction in emission intensity of the laser beam LB due to the contamination is corrected within a certain range by increasing the emission intensity of the laser beam LB.

However, the non-uniform exposure in the main scanning direction M1 cannot be corrected by adjusting the emission intensity. Therefore, it is necessary to replace the polygon mirror 62 together with the polygon mirror unit 61 with a new one before the contamination on the mirror surface 620 of the polygon mirror 62 exceeds the allowable range, for example, before the end of the life of the polygon mirror 62.

The image forming apparatus 1 determines the degree of contamination in the printer head 6 and increases the emission intensity of the laser beam LB or requests the user to replace the polygon mirror 62 according to the degree of contamination.

The image forming apparatus 1 has a function of detecting "minimum level" relating to light emission of the laser beam LB to determine the degree of contamination. The minimum level is the lowest light intensity level, within a range in which the optical sensor 78 detects the laser beam LB, of a plurality of light intensity levels as a set value of the emission intensity in light emission control of the laser beam LB.

Hereinafter, the configuration and operation of the image forming apparatus 1 will be described focusing on the function of detecting the minimum level.

Figure 5:
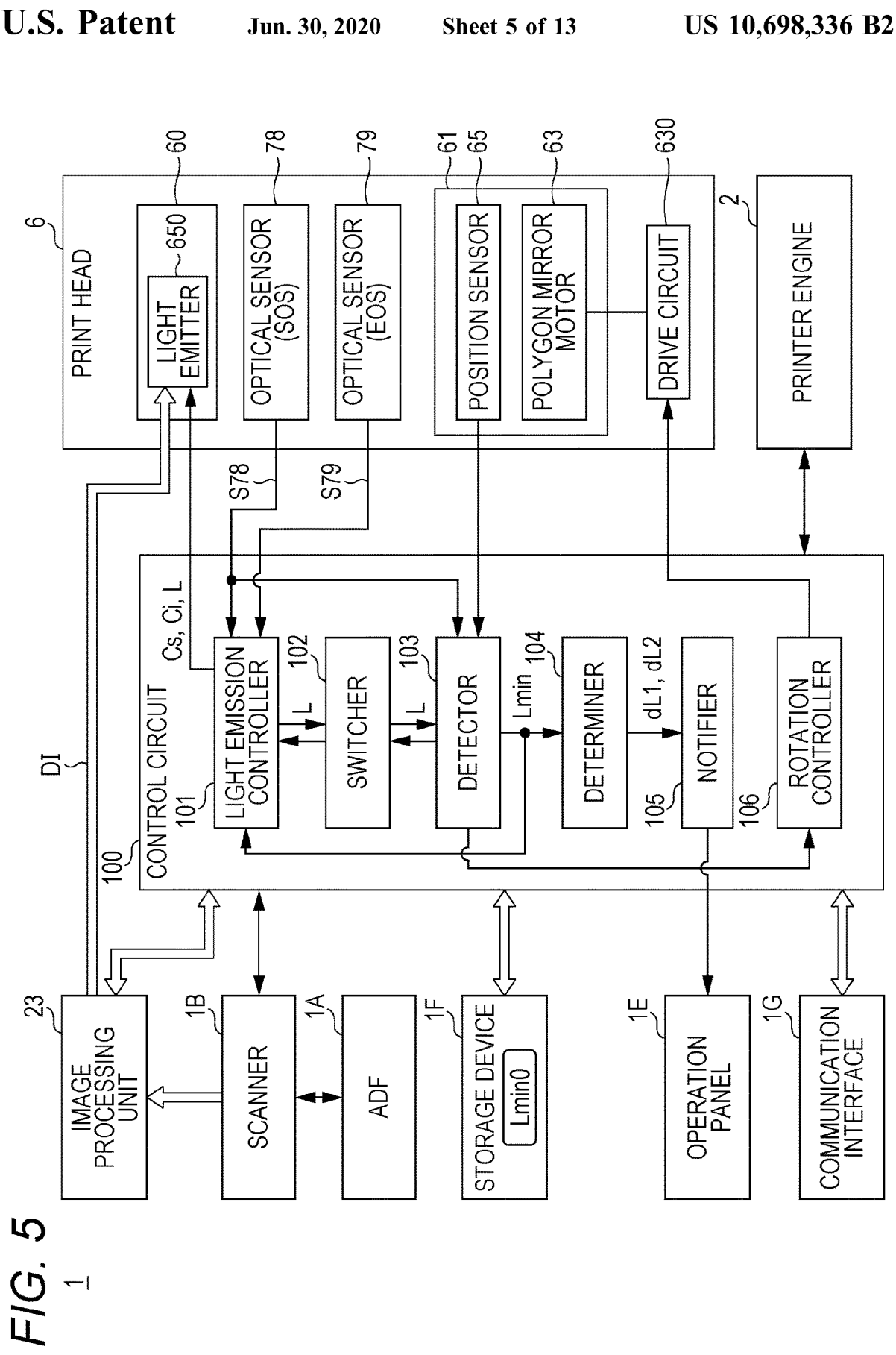
FIG. 5 is a diagram illustrating an example of a functional configuration of a control circuit.
Figure 6A:
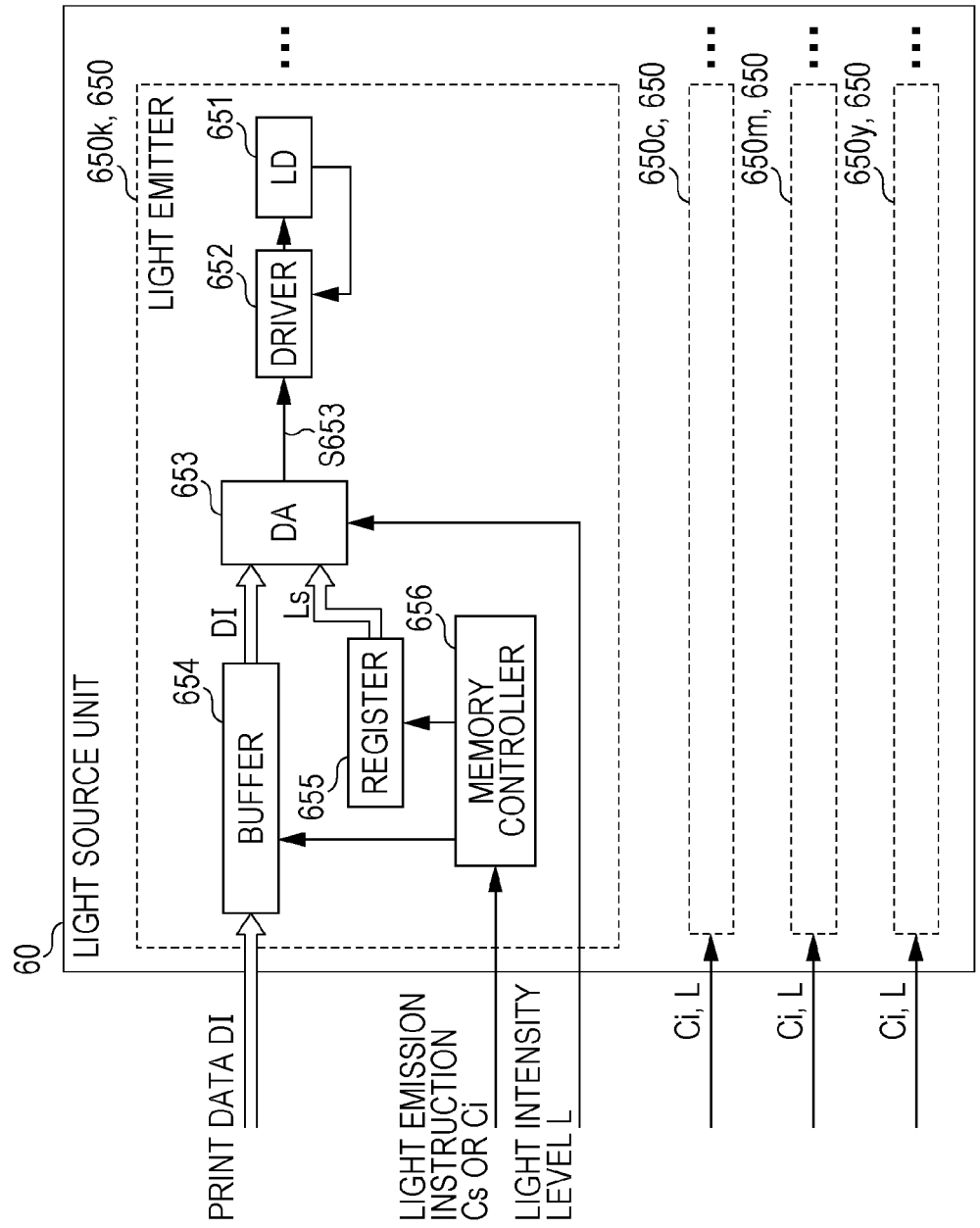
FIGS. 6A to 6C are diagrams each illustrating an example of a configuration of a light emitter in a light source unit.
Figure 6B:
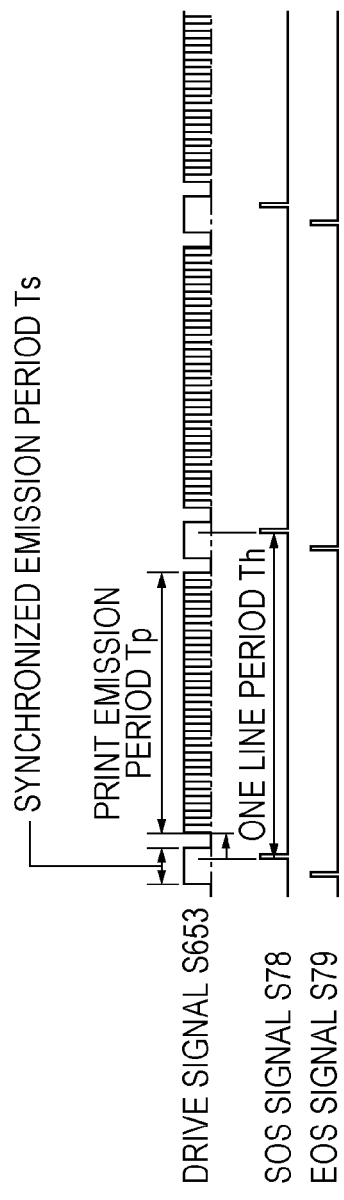
Figure 6C:
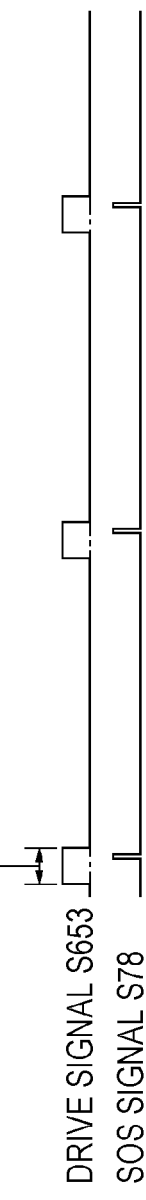

FIG. 5 illustrates an example of a functional configuration of the control circuit 100, and FIGS. 6A to 6C each illustrate an example of a configuration of a light emitter 650 in the light source unit 60.

In FIG. 5, the control circuit 100 receives a print job input by operation using the operation panel 1E or by network communication and controls the execution of the print job. For example, in a copy job, the printer engine 2 and the printer head 6 are caused to prepare image formation and the scanner 1B and the image processing unit 23 are controlled to give print data DI to the light source unit 60 of the printer head 6. The print data DI is multi-value data or binary data on the basis of which laser emission control is performed for pattern exposure to form a latent image.

The control circuit 100 includes a light emission controller 101, a switcher 102, a detector 103, a determiner 104, a notifier 105, a rotation controller 106, and the like. These functions are achieved by a hardware configuration of the control circuit 100 including a central processing unit (CPU) and by execution of a control program by the CPU.

The light emission controller 101 controls the light source unit 60 to modulate (or interrupt) the laser beam LB in accordance with the print data DI at timing synchronized with the SOS signal S78 and the EOS signal S79 transmitted from the optical sensors 78 and 79.

The detector 103 detects the minimum level Lmin in cooperation with the switcher 102.

The details are as follows.

The switcher 102 indirectly controls the light source unit 60 by requesting the light emission controller 101 to control the light intensity until the detector 103 detects the minimum level Lmin and sequentially switches the light intensity level L of the laser beam LB emitted from the light emitter 650. The first light intensity level L is a reference level Ls which is defined as the light intensity level L when the laser beam LB is incident on the optical sensor 78 in image formation.

When the SOS signal S78 is input during a time period when the SOS signal S78 is to be input from the optical sensor 78, the detector 103 notifies the switcher 102 of the input of the SOS signal S78. When receiving the notification, the switcher 102 switches the light intensity from the reference level Ls to a light intensity level L lower than the reference level Ls by one. When the SOS signal S78 having the light intensity level reduced by one is input to the detector 103, the light intensity level input is switched to a light intensity level L smaller than the input light intensity level by one. Thereafter, the light intensity level L is similarly reduced one by one.

When the SOS signal S78 is not input, the detector 103 detects, as the minimum level Lmin, a light intensity level L which is higher than a light intensity level L by one at that time, in other words, the lowest light intensity level L of those of SOS signals S78 having been input. Then, the switcher 102 is notified of the detection of the lowest light intensity level Lmin and the determiner 104 is notified of the detected minimum level Lmin. Furthermore, as information for setting the emission intensity to make the intensity of light incident on the photoreceptor 4 and the optical sensors 78 and 79 appropriate upon image formation, the light emission controller 101 is also notified of the detected minimum level Lmin.

The processing of detecting the minimum level Lmin in such a procedure is performed at a predetermined time. For example, the processing of detecting the minimum level Lmin may be defined to be performed when image stabilization processing for adjusting image forming conditions is performed to maintain image quality in a constant state. The image stabilization processing is performed when a predetermined condition is satisfied, for example, when a power switch of the image forming apparatus 1 is turned on, when a large number of images are printed, or when the temperature in the image forming apparatus 1 makes a large change.

The determiner 104 determines the degree of contamination of an optical component on the optical path 600 of the laser beam LB extending from the light emitter 650 to the optical sensor 78, on the basis of the minimum level Lmin detected by the detector 103.

For example, the determiner 104 outputs, as a determination result, a level variation dL1 which is a difference between the latest minimum level Lmin detected and an initial minimum level Lmin1 read from the storage device 1F. The initial minimum level Lmin1 is a minimum level Lmin detected when the optical path 600 is in the initial state in which total use hours is shorter than a set value and, for example, is written and stored in the storage device 1F by the detector 103. The initial minimum level Lmin1 may be detected and stored when the image forming apparatus 1 is shipped from the factory. The larger the level variation dL1 is, the larger the degree of contamination is.

Alternatively, the determiner 104 outputs, as a determination result, a difference dL2 between the reference level Ls described above and the latest minimum level Lmin detected. In this case, the smaller the difference dL2, the larger the degree of contamination.

When the determined degree of contamination is within a first range, the notifier 105 performs notification processing to recommend protecting the polygon mirror 62 from dust, and when the degree of contamination is larger than the first range, the notifier 105 performs notification processing to request a replacement of the polygon mirror. The notification processing includes processing of displaying a message indicating that a service call is necessary on the display of the operation panel 1E and processing of transmitting a determination result to a management device of an external service center by using a communication interface 1G. One or both of the processing of displaying a message and the processing of transmitting a determination result may be performed.

The rotation controller 106 gives an instruction to rotate the polygon mirror motor 63 at a predetermined speed to a drive circuit 630 of the polygon mirror motor 63. When performing the detection of the minimum level Lmin, the rotation controller 106 rotates the polygon mirror 62 at a speed slower than that in image formation.

As illustrated in FIG. 6A, the light source unit 60 includes four light emitters 650y, 650m, 650c, and 650k corresponding to the colors of Y, M, C, and K. As illustrated in FIG. 6A, of the light emitters 650y, 650m, 650c, and 650k, the light emitter 650k corresponding to the color of K, which is a monochrome printing color, includes a laser light source 651, a driver 652, a DA converter 653, a buffer 654, a register 655, and a memory controller 656. Although illustration is omitted, the light emitters 650y, 650m, and 650c corresponding to the remaining colors Y, M, and C have the same configurations as the configuration of the light emitter 650k except that the register 655 is not provided.

The laser light source 651 is a laser diode (semiconductor laser) for emitting the laser beam LB and includes a photodiode for a light emission monitor. The emission intensity of the laser beam LB emitted from the laser light source 651 depends on a forward drive current flowing from a power supply line.

The driver 652 includes a transistor controlled by a drive signal S653 from the DA converter 653 and increases or decreases the drive current flowing through the laser light source 651 in response to the drive signal S653. The driver 652 has a function of suppressing a fluctuation in emission intensity due to a temperature change on the basis of a feedback signal from the laser light source 651.

The buffer 654 temporarily stores the print data DI transferred from the image processing unit 23 and sends the print data DI to the DA converter 653 at predetermined timing. The timing is controlled by the memory controller 656.

The register 655 stores the reference level Ls. The reference level Ls is the light intensity level L defined as the emission intensity during a synchronized emission period Ts in which the laser light source 651 is caused to emit light to obtain the SOS signal S78 and the EOS signal S79 in image formation. The reference level Ls is stored in advance in the register 655 and is sent to the DA converter 653 at predetermined timing.

The memory controller 656 controls data output from the buffer 654 and the register 655 in accordance with light emission instructions Cs and Ci from the light emission controller 101. Specifically, when the light emission instruction Cs is input, the register 655 is controlled to keep outputting the reference level Ls until a predetermined time elapses. The buffer 654 is controlled to start serial output of the print data DI for one line each time the light emission instruction Cs is input.

The DA converter 653 converts the print data DI input via the buffer 654 and the reference level Ls read and input from the register 655 into the drive signal S653, which is an analog signal.

The print data DI and the reference level Ls are not simultaneously input to the DA converter 653, and a period in which the print data DI is input and a period in which the reference level Ls is input do not overlap each other. The details are as follows.

FIG. 6B schematically illustrates a waveform of the drive signal S653 in image formation and also illustrates the timing of generation of the SOS signal S78 and the EOS signal S79.

In the example of FIG. 6B, the synchronized emission period Ts is a continuous period including a period in which generation of the EOS signal S79 is scheduled and a period in which generation of the SOS signal S78 is scheduled. In other words, within the synchronized emission period Ts, the EOS signal S79 and the SOS signal S78 are generated once each. During the synchronized emission period Ts, the drive signal S653 has a constant value.

The print emission period Tp starts from the timing after a time required for deflection of the laser beam LB to the image area has elapsed from the timing (for example, a front edge) of generating the SOS signal S78. The timing at which pattern exposure based on the print data DI for one line ends is the end of the print emission period Tp. During the print emission period Tp, the drive signal S653 has a value changing depending on a data value of each pixel of the print data DI. The amplitude of the drive signal S653 in the print emission period Tp and the amplitude thereof in the synchronized emission period Ts may be the same as illustrated in FIG. 6B, or may be different from each other. In image formation, the print emission period Tp is provided every one line period Th.

Returning to FIG. 6A, the DA converter 653 has an offset function for making output values (the values of the drive signal S653) different for the same input value. The light intensity level L is input from the light emission controller 101 to the DA converter 653 as a control signal for specifying an offset.

When the offset is set to 0 (zero), for example, the reference level Ls is input as the control signal. When the light intensity level L higher than the reference level Ls is input as the control signal, the DA converter 653 converts the control signal to the drive signal S653 having an emission intensity increased as compared with when the reference level Ls is input. Conversely, when the light intensity level L lower than the reference level Ls is input as the control signal, the DA converter 653 converts the control signal to the drive signal S653 having an emission intensity reduced as compared with when the reference level Ls is input.

Such an offset function enables the image forming apparatus 1 to compensate for a decrease in the intensity of light emitted to the photoreceptor 4 due to the contamination of the components on the optical path 600. That is, when the intensity of light emitted decreases, the value of the drive signal S653 is shifted to increase the emission intensity, and the intensity of light emitted to be returned to the original value thereof.

In the present embodiment, the minimum level Lmin is detected by using a hardware configuration of the light emitter 650k having this offset function. Thus, unlike the conventional example, the degree of contamination of the components on the optical path 600 can be determined without using a circuit for detecting a peak value or a pulse width of the photoelectric conversion signal in the optical sensor 78.

FIG. 6C illustrates a waveform of the drive signal S653 and the timing of generation of the SOS signal S78 when the minimum level Lmin is to be detected.

In detection of the minimum level Lmin, the light emitter 650k is controlled not to emit the laser beam LB during a period when the laser beam LB deflected passes through the main optical path 600A (image forming area) and to emit the laser beam LB during a period when the laser beam LB passes outside the main optical path 600A. In other words, the synchronized emission period Ts is provided, but the print emission period Tp is not provided. Not giving a light emission instruction Ci to the memory controller 656 corresponds to control to inhibit the emission of the laser beam LB while the laser beam LB passes through the main optical path 600A.

As the processing of detection, as described above, while monitoring the presence or absence of the SOS signal S78, the light intensity level L input as the control signal to the DA converter 653 is sequentially switched from the reference level Ls to a lower light intensity level L.

A switching cycle for switching the light intensity level L is preferably an integral multiple of one line period Th. When the switching cycle is one line period Th and a switching is made between a synchronized emission period Ts and the next synchronized emission period Ts, the time required for detection is minimized.

Assuming that the switching cycle is six times the one line period Th, the minimum level Lmin is detected for each of the six mirror surfaces 620. Since every six synchronized emission periods Ts correspond to the same mirror surface 620, the synchronized emission period Ts is counted by using a counter for counting 1 to 6 to identify a mirror surface 620 in accordance with a count value.

In addition, assuming that counting is started upon detection of the reference position by the position sensor 65, a correspondence between a count value and a mirror surface 620 is always uniquely determined. Therefore, detecting the minimum level Lmin periodically for each mirror surface 620 and recording the minimum level Lmin in association with the count value enables to determine a temporal change in minimum level Lmin for each mirror surface 620.

Figures 7A, 7B:
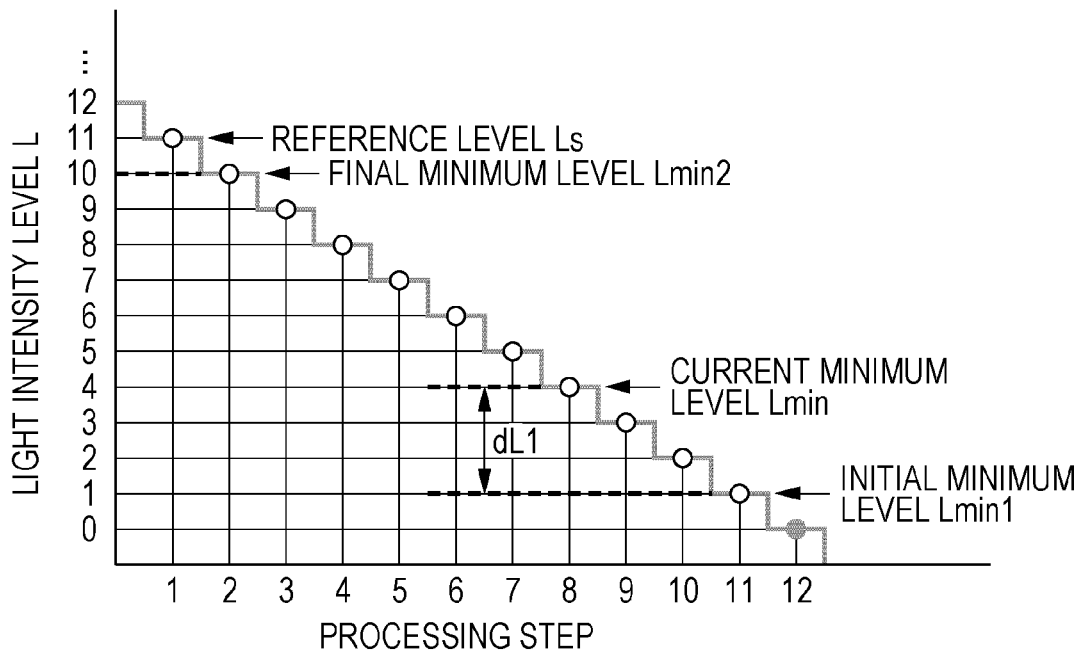
FIGS. 7A and 7B are diagrams illustrating a first example of a method of determining a degree of contamination.
Figures 8A, 8B:
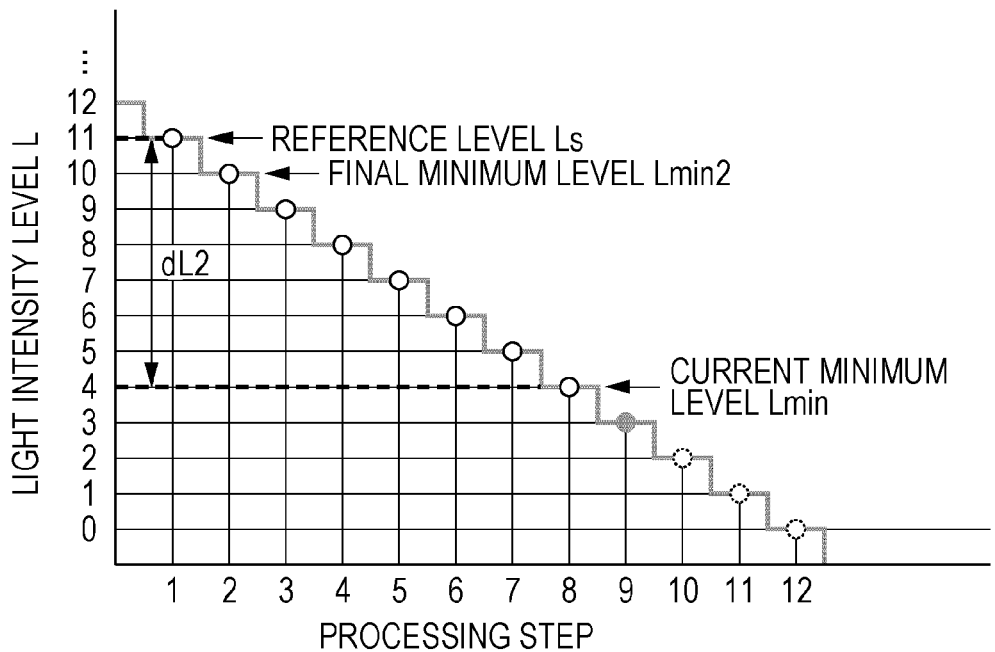
FIGS. 8A and 8B are diagrams illustrating a second example of the method of determining a degree of contamination.

FIGS. 7A and 7B illustrate a first example of a method of determining a degree of contamination, and FIGS. 8A and 8B also illustrate a second example thereof.

In the first example of FIGS. 7A and 7B, the level variation dL1 which is a difference between a current minimum level Lmin detected and the stored initial minimum level Lmin1 is calculated as a degree of contamination.

The light intensity level L is switched to, for example, 12 levels of level 0 to level 11 to detect the minimum level Lmin. Level 0 is the lowest level within the range of switching, and level 11 is the highest level within the range of switching. Level 11 is defined as the reference level Ls. Furthermore, the level 10 is defined as a final minimum level Lmin2 The final minimum level Lmin2 is a minimum level Lmin in a state where it is considered that the life of the optical path 600 (substantially, the life of the polygon mirror 62) has expired.

In FIG. 7A, the initial minimum level Lmin1 is at level 1. In other words, in detection of the minimum level Lmin performed when the optical path 600 is in the initial state, the SOS signal S78 is generated at levels 11 to 1 and is not generated when the level is lowered to level 0.

The current minimum level Lmin, after a long time from the initial state of the optical path 600, is at level 4. Therefore, the level variation dL1 which is the current degree of contamination is calculated as "3" by subtracting 1 from 4.

FIG. 7B illustrates an example of a dirt classification table 91. In the dirt classification table 91, the degree of contamination is classified into level A (low), level B (high), and level C (excessive), and values of the level variation dL1 corresponding to each of the levels are defined.

When the level variation dL1 is 0 to 3, the degree of contamination is at level A. In this case, for example, the temporal change may be monitored continuously without performing notification processing for the user.

When the level variation dL1 is 4 to 8, the degree of contamination is at level B. In this case, the notification processing is performed to notify the user that the contamination advances. In the notification processing, on the basis of an increase in the total use hours from a previous detection of the minimum level Lmin to the current detection thereof and an increase in the level variation dL1, the remaining use time (remaining life) until the contamination of the optical path 600 reaches the limit (lifetime) may be calculated and displayed. Furthermore, in order to extend the life, a recommendation may be made for the user to take dust prevention measures for the polygon mirror unit 61.

When the level variation dL1 is 9, the degree of contamination is at level C. In this case, notification processing for prohibiting printing and requesting replacement of the polygon mirror 62 is performed.

In the second example of FIGS. 8A and 8B, a difference dL2 between the predetermined reference level Ls and a detected current minimum level Lmin is calculated as a degree of contamination. As in the first example of FIGS. 7A and 7B, the light intensity level L is switched to 12 levels to detect the minimum level Lmin.

In FIG. 8A, the current minimum level Lmin is at level 4. That is, when the light intensity level L is at levels 11 to 4, the SOS signal S78 is generated and is not generated when the level is lowered to level 3.

When the minimum level Lmin is at level 4, the difference dL2 which is the degree of contamination is calculated as "7" by subtracting 4 from 11.

In a dirt classification table 92 illustrated in FIG. 8B, the degree of contamination is classified into level A, level B, and level C, and values of the difference dL2 corresponding to each of the levels are defined. When the difference dL2 is 10 to 7, the degree of contamination is at level A, when the difference dL2 is 6 to 2, the degree of contamination is at level B, and when the difference dL2 is 1, the degree of contamination is at level C.

Depending on the current level (A to C) of the degree of contamination, predetermined countermeasures, such as notification processing to the user, can be taken as described above.

Figure 9A:
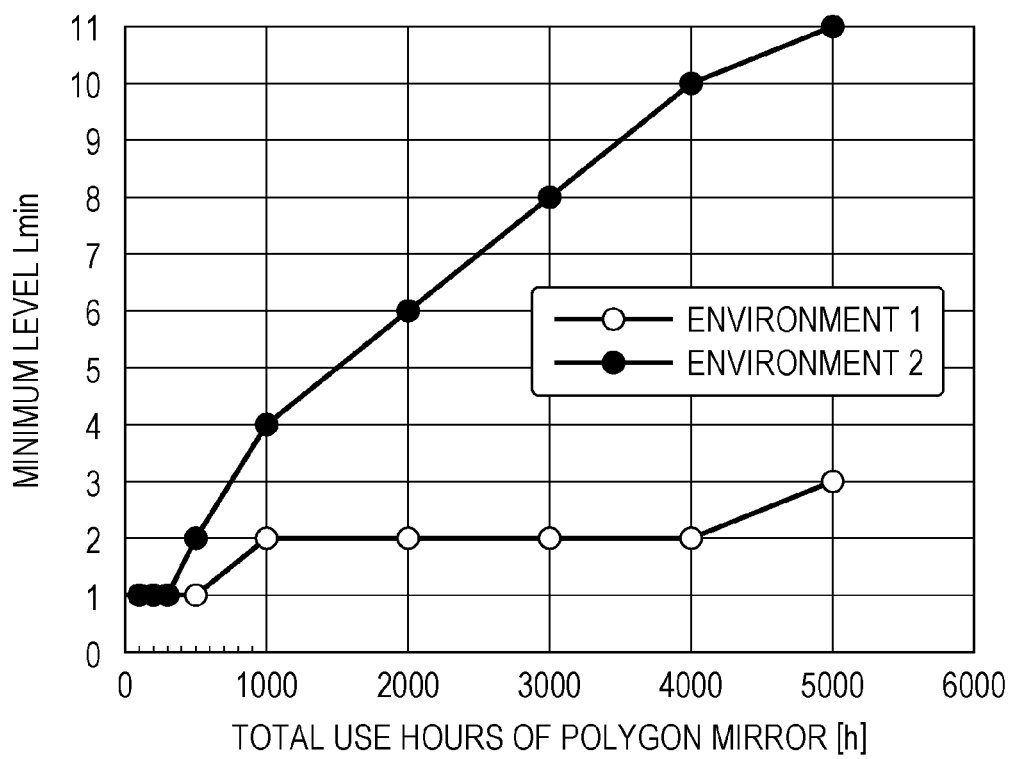
FIGS. 9A and 9B are graphs each illustrating an example of a temporal change in minimum level.
Figure 9B:
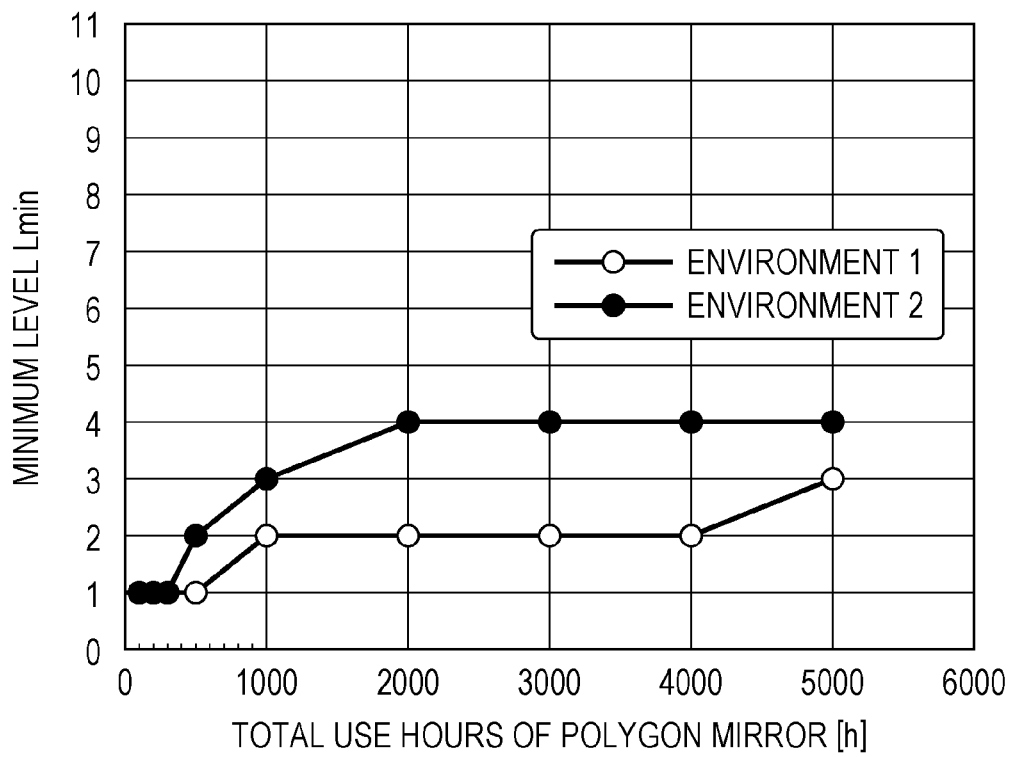

FIGS. 9A and 9B each illustrate an example of a temporal change in minimum level Lmin. In FIGS. 9A and 9B, white circles represent a temporal change in minimum level Lmin when the image forming apparatus 1 is used in an environment 1 with a relatively small amount of dust, and black circles represent a temporal change in minimum level Lmin when the image forming apparatus 1 is used in an environment 2 with a large amount of dust. Furthermore, FIG. 9A illustrates a temporal change when no dust prevention measures are taken to enhance the airtightness of the polygon mirror unit 61 in any of the environment 1 and the environment 2, and FIG. 9B illustrates a temporal change when dust prevention measures are taken to use the polygon mirror unit 61 in the environment 2.

As illustrated in FIG. 9A, in the environment 1 with a relatively small amount of dust, the temporal change proceeds (rise of the minimum level Lmin) relatively slowly, and in the environment 2 with a large amount of dust, the temporal change proceeds relatively fast.

Specifically, in the environment 1, the minimum level Lmin is approximately 3 even when the polygon mirror unit 61 is used for up to 5,000 h, which is the standard life of the polygon mirror unit 61. This is a level at which the image forming apparatus 1 is well used without any problem.

On the other hand, in the environment 2, the minimum level Lmin reaches 4 after the polygon mirror unit 61 is used for 2,000 h, and when the polygon mirror unit 61 is used for up to 5000 h, the minimum level Lmin reaches 11 being the reference level Ls. This situation frequently causes an error in the SOS signal, and the image forming apparatus 1 cannot be used for printing.

As illustrated in FIG. 9B, even in the environment 2, when the dust prevention measures are taken for the polygon mirror unit 61 by, for example, a service person receiving a notice that the minimum level Lmin has reached 4, the contamination remains substantially at the same level. The dust prevention measures are processing of sealing a gap of the housing of the polygon mirror unit 61 with a black caulking material. Although it is conceivable to take dust prevention measures during production of the polygon mirror unit 61, this increases the cost of the polygon mirror unit 61 expensive, and a user who uses the image forming apparatus in an environment requiring no countermeasures needs to unnecessarily pay the cost. Therefore, the polygon mirror unit 61 is simply sealed during the production.

Furthermore, recording a history of detection of the minimum level Lmin enables the service person to determine whether the image forming apparatus is used in the environment 2 where the temporal change proceeds fast, on the basis of the history, upon replacement of the polygon mirror unit 61 with a new one. When it is determined that the image forming apparatus is used in the environment 2, dust prevention measures are taken for the new polygon mirror unit 61, prolonging the usable time until the next replacement. This configuration effectively reduces the running cost of the image forming apparatus 1 for the user.

Figure 10:
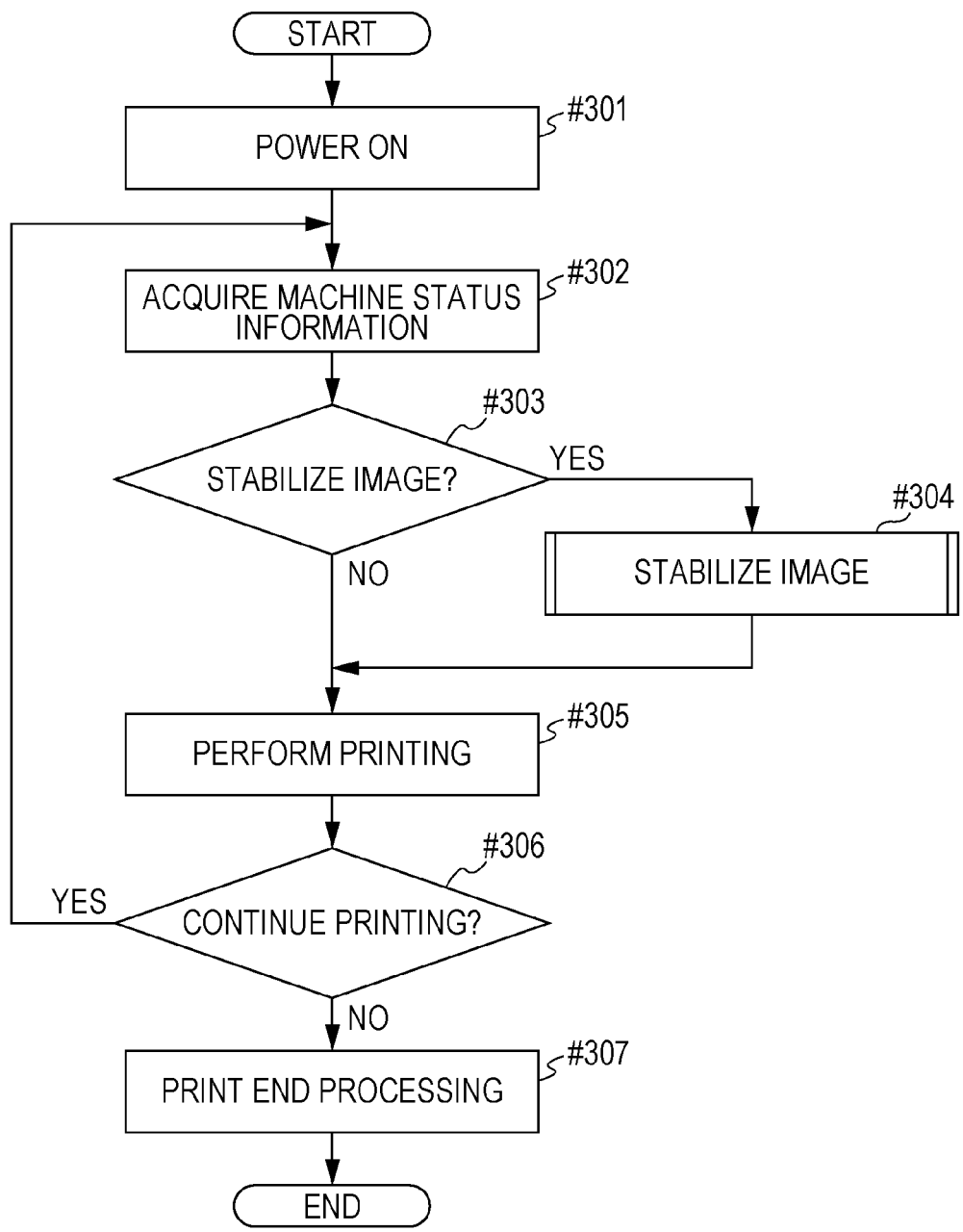
FIG. 10 is a flowchart illustrating processing in the image forming apparatus.

FIG. 10 is a flowchart illustrating processing in the image forming apparatus 1.

In a power-on state in which power necessary for operation is supplied (#301), machine status information is acquired by collecting durability information stored in various places and outputs made from various sensors (#302), and whether to perform image stabilization processing is determined on the basis of the machine status information (#303).

When it is determined that the image stabilization processing is to be performed (YES in #303), the image stabilization processing is performed (#304), and when it is determined that the image stabilization processing is not to be performed (NO in #303), a print job input is executed (#305).

During the execution of the print job, for example, each time an image is printed on one side of a sheet P, it is determined whether to continue printing (#306). In other words, it is checked whether printing images, the number of which is specified by the print job, is completed and whether there are queued job.

When it is determined that printing is not to be continued (NO in #306), print end processing is performed (#307). In the print end processing, the printer engine 2 is put in a standby state, or job execution history information is updated.

When it is determined that printing is to be continued (YES in #306), the process returns to step #302 to acquire the latest machine status information again. When the number of images continuously printed exceeds a predetermined value or a large internal temperature rise is caused, due to the execution of the print job, it is determined in the next step #303 that the image stabilization processing is performed. In this case, execution of the print job is interrupted to perform image stabilization processing (#304).

Figure 11:
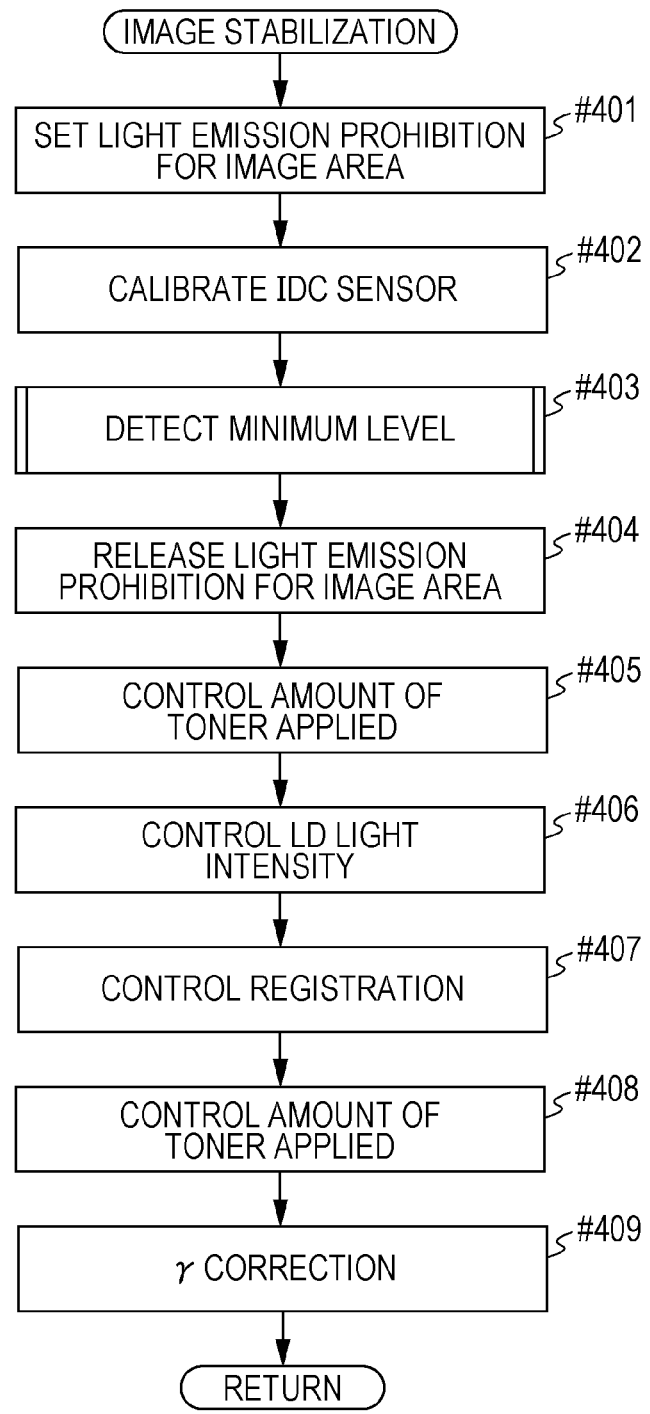
FIG. 11 is a flowchart illustrating image stabilization processing.

FIG. 11 illustrates a flowchart of the image stabilization processing. The image stabilization processing includes calibration of a density sensor (IDC sensor) disposed in the vicinity of the intermediate transfer belt 10. Since it is not necessary to cause the laser light source 651 to emit light in this calibration, the calibration and the minimum level detection are performed in parallel to shorten the time required for the image stabilization processing.

In order to prevent any trouble in the calibration of the IDC sensor, firstly, light emission prohibition setting is performed to prevent the incidence of the laser beam LB on the image area of the photoreceptor 4 (#401).

Next, the calibration of the IDC sensor is started (#402), and minimum level detection processing for detecting the minimum level Lmin is performed in parallel with the calibration of the IDC sensor (#403). In the minimum level detection processing, when the SOS signal S78 cannot be obtained, the laser beam LB is made incident on the image area of the photoreceptor 4. However, since the intensity of the laser beam at this time is at a sufficiently low level, the calibration of the IDC sensor is not substantially affected. When the minimum level detection processing is completed, the light emission prohibition setting is canceled (#404).

After that, on the basis of detection results from the IDC sensor, control for the amount of toner applied (#405) which adjusts a charge output, a development output, and the like, control for LD light intensity (#406) which adjusts a pattern exposure, and registration control (#407) which corrects a shift in four colors are performed.

Then, the amount of toner applied is controlled again (#408), and finally, γ correction for adjusting image tone reproduction is performed (#409).

Figure 12:
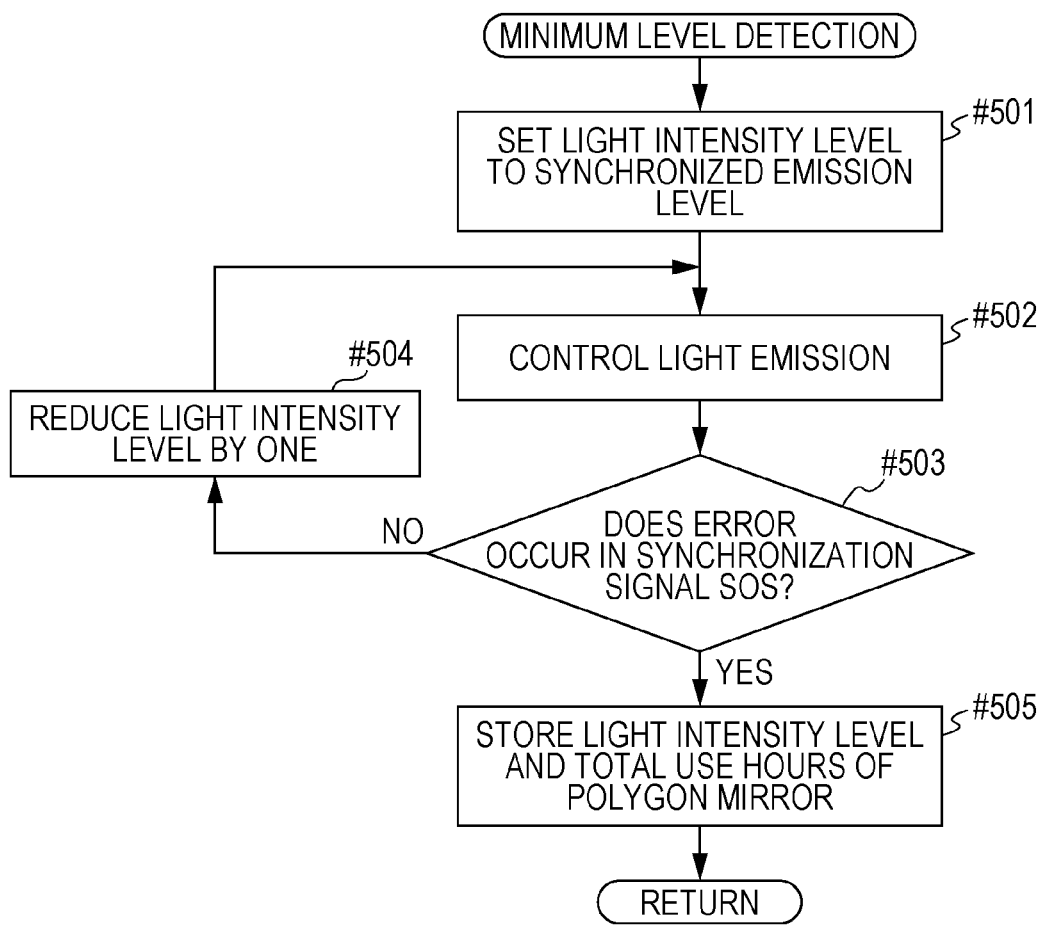
FIG. 12 is a flowchart illustrating minimum level detection processing.

FIG. 12 illustrates a flowchart of the minimum level detection processing.

The reference level Ls is set as the first light intensity level L in detection (#501), and the laser light source 651 is caused to emit light while rotating the polygon mirror 62 (#502), checking whether an error that the SOS signal S78 cannot be obtained occurs (#503).

When no error occurs, in other words, when the SOS signal S78 is obtained (NO in #503), the light intensity level L is lowered by 1 (#504), and the process returns to step #502. Then, the presence or absence of an error in the SOS signal S78 is checked.

When an error in the SOS signal S78 occurs (YES in #503), the minimum level Lmin, which is a light intensity level L one higher than a light intensity level L set at that time, and a total use hours of the polygon mirror 62 are stored (#505). Then, the process returns to the flowchart of FIG. 11.

Note that whenever a minimum level Lmin and total use hours are stored, data are stored in a different memory area to determine a temporal change. However, when a configuration does not determine the temporal change, data may be overwritten in the same memory area. Furthermore, when it is only required to notify of the minimum level Lmin and the total use hours or a determination result based on the minimum level Lmin and the total use hours, the storage thereof may be omitted.

According to the embodiments described above, a reduction in the light intensity of the laser beam LB directed to the photoreceptor 4 is quantified on the basis of an output from the optical sensor 78 having a simple configuration for only converting the photoelectric conversion signal to a pulse signal. Unlike a conventional example, it is not necessary to detect the peak value of the photoelectric conversion signal or to detect the pulse width. In addition, an existing circuit with variable emission intensity can be used for light emission control of the laser light source 651, and a reduction in light intensity due to contamination of various components on the optical path 600 is quantified without complicating a circuit on the light emission side.

Therefore, a circuit used for light intensity measurement for determining the degree of contamination of the scanning optical system including the polygon mirror 62 can be simplified as compared with conventional art.

In the embodiments described above, it is not necessary to set the first light intensity level L as the reference level Ls when detecting the minimum level Lmin. For example, a light intensity level Ls between the reference level Ls and the last detected minimum level Lmin may be lowered one by one. Furthermore, the light intensity level L is not necessarily switched in order from high to low, and the minimum level Lmin can be detected even when the order is changed at random.

In the embodiment described above, although an example has been described in which the emission intensity of the laser light source 651 is changed by using the offset function of the DA converter 653, the present invention is not limited to this example. For example, when adopting a configuration in which the image processing unit 23 generates multi-valued print data DI and multi-valued data for synchronized emission, the image processing unit 23 is desirably controlled to change the value of data for synchronized emission to the light intensity level L according to switching. In that case, in image formation, the value of the print data DI is desirably increased to compensate for a reduction in an exposure of the photoreceptor 4 according to the degree of contamination.

In the polygon mirror 62, considering that eccentric rotation axis, variation in inclination of the mirror surfaces 620, and the like causes variation in the degree of contamination between the mirror surfaces 620, the minimum level Lmin may be detected for each mirror surface 620. In that case, the degree of contamination is preferably determined on the basis of the highest level of a plurality of minimum levels Lmin detected.

In addition, the minimum level Lmin for each mirror surface 620 may be detected a plurality of times every predetermined period, identifying a mirror surface 620 on which contamination advances fastest on the basis of the results of the detection, detecting thereafter the minimum level Lmin only for the identified mirror surface 620.

In the embodiments described above, the detector 103, the determiner 104, and the like may be remotely controlled from the management device of the service center.

The position sensor 65 may emit a position detection signal S65 at timing at which deflection by one mirror surface 620 set as a reference surface in advance, starts. For example, a magnet may be provided at a rotational angle position corresponding to a reference surface of a shaft of the polygon mirror motor 63, disposing a Hall element sensitive to the magnet near the shaft to form the position sensor 65. Alternatively, a reflective photosensor for detecting a mark placed on the shaft may be used as the position sensor 65.

In addition, the whole or part of the configuration of the image forming apparatus 1, the contents of operation and processing, order or timing, a switching width (resolution) and switching steps of the light intensity level L, the number of levels in the degree of contamination, a value of the minimum level Lmin corresponding to each level, the contents of the countermeasures, and the like may be appropriately changed without departing from the scope and spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus including a polygon mirror that deflects a light beam, the image forming apparatus comprising:
    a light emitter that emits the light beam;
    an optical sensor that is disposed at a position on which the light beam deflected by the polygon mirror is incident;
    a detector that detects a minimum level being a light intensity level of the light beam, the lowest within a range detected by the optical sensor;
    a switcher that switches a light intensity level of the light beam emitted from the light emitter until the detector detects the minimum level; and
    a determiner that determines a degree of contamination of a component on an optical path of the light beam extending from the light emitter to the optical sensor, on the basis of the minimum level detected when the light intensity level is switched by the switcher.

2. The image forming apparatus according to claim 1, wherein
    the switcher controls the light emitter to reduce the light intensity level from a reference level defined as the light intensity level when the light beam is incident on the optical sensor upon image formation, in detection of the minimum level, and
    the determiner outputs a difference between the reference level and the minimum level detected, as a determination result.

3. The image forming apparatus according to claim 1, further comprising
    a memory that stores, as an initial minimum level, the minimum level detected when the optical path is in an initial state in which total use hours is shorter than a set value,
    wherein the determiner outputs, as a determination result, a difference between the minimum level detected and the initial minimum level.

4. The image forming apparatus according to claim 1, wherein
    the optical sensor is disposed, as a sensor to generate a synchronization signal for image formation, such that the light beam passing through an upstream portion in a deflection direction of an optical path of the light beam deflected is incident on the optical sensor.

5. The image forming apparatus according to claim 1, wherein
    the detector detects the minimum levels for a plurality of mirror surfaces of the polygon mirror, and
    the determiner determines the degree of contamination on the basis of the highest level of the minimum levels detected for the mirror surfaces.

6. The image forming apparatus according to claim 1, further comprising
    a notifier that performs notification processing to recommend protecting the polygon mirror from dust when the degree of contamination determined is within a first range and performs notification processing to request a replacement of the polygon mirror when the degree of contamination is larger than the first range.

7. The image forming apparatus according to claim 1, further comprising
    a rotation controller that rotates the polygon mirror at a speed slower than that in image formation when performing detection of the minimum level.

8. The image forming apparatus according to claim 1, wherein
    the detector detects the minimum level when image stabilization processing that adjusts image forming conditions is performed to maintain image quality in a constant state.

9. The image forming apparatus according to claim 8, further comprising
    a light emission controller that controls the light emitter not to emit the light beam during a period when the light beam deflected passes through an image forming range, in detection of the minimum level.

10. The image forming apparatus according to claim 1, wherein
    the determiner transmits a result of the determination of the degree of contamination to an external management device.

11. The image forming apparatus according to claim 10, wherein
    the detector and the determiner are remotely controllable by the management device.

12. The image forming apparatus according to claim 1, wherein
    The optical sensor is disposed at a position so that the optical sensor detects a start of main scanning lines as the polygon mirror rotates.

* * * * *